(12) United States Patent
Lee et al.

(10) Patent No.: US 9,208,399 B2
(45) Date of Patent: Dec. 8, 2015

(54) METHOD OF EXTRACTING VISUAL DESCRIPTOR USING FEATURE SELECTION AND SYSTEM FOR THE SAME

(71) Applicant: Electronics and Telecommunications Research Institute, Daejeon (KR)

(72) Inventors: Keun-Dong Lee, Daejeon (KR); Seung-Jae Lee, Daejeon (KR); Sang-Il Na, Daejeon (KR); Sung-Kwan Je, Daejeon (KR); Da-Un Jung, Daejeon (KR); Weon-Geun Oh, Daejeon (KR); Young-Ho Suh, Daejeon (KR); Wook-Ho Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 79 days.

(21) Appl. No.: 14/223,836

(22) Filed: Mar. 24, 2014

(65) Prior Publication Data

US 2015/0117785 A1    Apr. 30, 2015

(30) Foreign Application Priority Data

Oct. 25, 2013   (KR) ........................ 10-2013-0128056

(51) Int. Cl.
*G06K 9/46* (2006.01)
*G06K 9/22* (2006.01)

(52) U.S. Cl.
CPC .............. *G06K 9/4671* (2013.01); *G06K 9/228* (2013.01)

(58) Field of Classification Search
None
See application file for complete search history.

(56) References Cited

U.S. PATENT DOCUMENTS

| | | |
|---|---|---|
| 2006/0195858 A1 | 8/2006 | Takahashi et al. |
| 2009/0015676 A1* | 1/2009 | Ke et al. .................. 348/169 |
| 2011/0058733 A1 | 3/2011 | Inoue et al. |
| 2011/0176734 A1* | 7/2011 | Lee et al. .................. 382/197 |

FOREIGN PATENT DOCUMENTS

| | | |
|---|---|---|
| KR | 10-2009-0113617 A | 11/2009 |
| KR | 10-2011-0085728 A | 7/2011 |

OTHER PUBLICATIONS

Gianluca Francini et al., "Selection oflocalfeaturesforvisualsearch", SignalProcessing: Image Communication, 2013, vol. 28, pp. 311-322.

David G. Lowe, "Distinctive Image Features from Scale-Invariant Keypoints", International Journal of Computer Vision, 2004, vol. 60, No. 2, pp. 91-110.

Herbert Bay et al., "Speeded-Up Robust Features (SURF)", Computer Vision and Image Understanding, 2008, vol. 110, pp. 346-359.

* cited by examiner

*Primary Examiner* — Chan Park
*Assistant Examiner* — Elisa Rice

(57) ABSTRACT

A method and system for extracting a visual descriptor using a feature selection are provided. The system includes an image input unit configured to receive an image, a candidate feature point group detecting unit configured to detect a point having a local maximum or minimum of local region filtering in scale-space images as being included in a candidate feature point group, a feature point selecting unit configured to calculate an importance for each candidate feature point, depending on its characteristics, select the candidate feature point as a feature point when its importance is greater than the predetermined threshold value, a dominant orientation calculating unit configured to calculate a dominant orientation of the selected feature point and a visual descriptor extracting unit configured to extract a patch for each feature point, according to its scale, location and dominant orientation, and extract a visual descriptor from the patch.

12 Claims, 6 Drawing Sheets

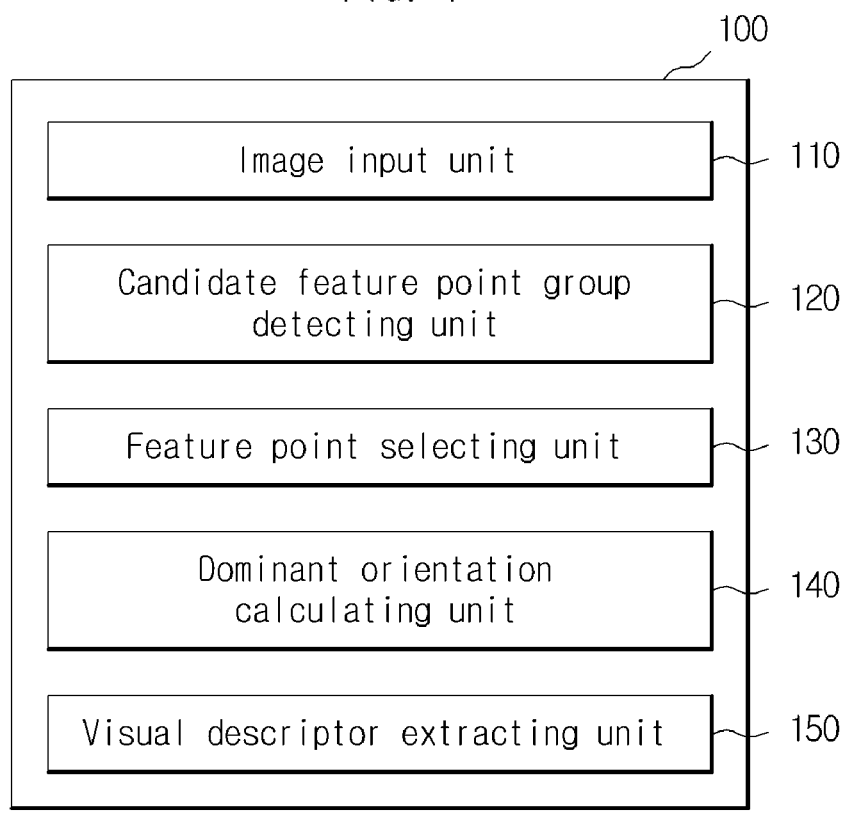

$D_x = I_R - I_L$ $D_y = I_{Up} - I_{Lo}$

METHOD OF EXTRACTING VISUAL DESCRIPTOR USING FEATURE SELECTION AND SYSTEM FOR THE SAME

CROSS-REFERENCE TO RELATED APPLICATION

This application claims priority to and the benefit of Korean Patent Application No. 10-2013-0128056, filed on Oct. 25, 2013, the disclosure of which is incorporated herein by reference in its entirety.

BACKGROUND

1. Field of the Invention

The present invention relates to a method of extracting a visual descriptor using a feature selection, and a system for the same.

2. Discussion of Related Art

A technology of generating a visual descriptor based on a feature point extracted from an image and matching the visual descriptor with another visual descriptor has been applied to various computer vision techniques, such as object recognition and detection, content based image retrieval, and video tracking, and much research on this technology is being conducted.

As a result of the emergence of smartphones, the amount of multimedia content being proliferated is expanding, so there is an increasing demand for technologies related to the above described computer vision, to effectively search and consume the content. In particular, it is difficult to enter text on a smartphone, which has led to a need for content based image retrieval technology in which a search is performed using an image as an input, and has also caused a search application using a feature based image processing to be developed more actively.

The feature based image processing is divided into a global feature based technology and a local feature based technology using a feature point. The local feature based image processing using a feature point is being spotlighted with its high performance in various environments.

Examples of the local feature based image processing technique using a feature point may include scale-invariant feature transform (SIFT) and Speeded Up Robust Features (SURF). In both SIFT and SURF, a point having a local maximum or minimum of local region filtering is detected as a feature point in a scale-space, and a feature descriptor is extracted using a local neighbor region surrounding a feature point. These techniques require great amounts of computation and memory for a visual descriptor extraction process and a matching process, and the visual descriptor has a size larger than that of a JPG image normalized to a resolution of 640*480, which is, in this respect, not suitable for a mobile visual search or large scale image retrieval that deals with several millions of images.

The related art of the present invention is disclosed in Korean Patent Publication No. 10-2009-0113617.

SUMMARY OF THE INVENTION

The present invention is directed to technology for extracting a visual descriptor suitable for a mobile smartphone environment that can reduce the computational complexity and extract compact descriptor by selecting features based on their importance and computing dominant orientation adaptively depending on the number of selected features. Such extraction of a visual descriptor enhances the efficiency in the terms of memory and execution time.

According to an aspect of the present invention, there is provided a system for extracting a visual descriptor using a feature selection, the system including: an image input unit configured to receive an image; a candidate feature point group detecting unit configured to detect a point having a local maximum or minimum of local region filtering in scale-space images as being included in a candidate feature point group; a feature point selecting unit configured to calculate an importance for each candidate feature point included in the candidate feature point group, depending on its characteristics, select the candidate feature point as a feature point when its importance is greater than the predetermined threshold value, and delete the candidate feature point when its importance is not greater than the predetermined threshold value; dominant orientation calculating unit configured to calculate a dominant orientation of the feature point selected by the feature point selecting unit; and a visual descriptor extracting unit configured to extract a patch for each feature point selected by the feature point selecting unit, according to its scale, location and dominant orientation, and extract a visual descriptor from the patch.

The candidate feature point group detecting unit may detect a point as being included in the candidate feature point group using one selected from a difference of Gaussians (DoG) detector, a Fast-Hessian detector, a Laplacian of Gaussian (LoG) detector and a Harris/Hessian-affine detector.

Dominant orientation calculating unit may calculate the dominant orientation of the feature point selected by the feature point selecting unit through one selected between a dominant orientation calculating method based on scale-invariant feature transfer (SIFT) and a dominant orientation calculating method based on Speeded Up Robust Features (SURF).

The visual descriptor extracting unit may extract the visual descriptor through one selected among SIFT, SURF and Oriented FAST and Rotated BRIEF (ORB).

The feature point selecting unit may select the feature point using an importance table depending on the characteristics of candidate feature point included in the candidate feature point group, wherein the importance table may include at least one of an importance depending on the peak of the candidate feature point, an importance depending on the scale of the candidate feature point, an importance depending on the edge score of the candidate feature point and an importance depending on the location of the candidate feature point.

Dominant orientation calculating unit is configured to: receive a scale-space layer and feature points detected from the scale-space layer; for each scale space layer in scale space images, calculate a dominant orientation of the feature point after calculating a gradient map of the scale-space layer when the number of the feature points detected from the scale-space layer is larger than or equal to the threshold value; and calculate a dominant orientation of the feature point by direct calculation of gradient without gradient map when the number of the feature points detected from the scale-space layer is below the threshold value.

The calculation of gradient value may be performed using one selected from a gradient magnitude and the calculation of the gradient magnitude and the gradient angle that are used in a SIFT and the calculation of the Haar wavelet response used in a SURF.

According to another aspect of the present invention, there is provided a method of extracting a visual descriptor using a feature selection, the method including: an image input step of receiving an image; a candidate feature point group detecting step of detecting a point having a local maximum or minimum of local region filtering in scale-space images as being included in a candidate feature point group; a feature point selecting step of calculating an importance for each candidate feature point included in the candidate feature point group, depending on the characteristics of the candidate feature point, selecting the candidate feature point as a feature point when its importance is greater than the predetermined threshold value, and deleting the candidate feature point when its importance is not greater than the predetermined threshold value; a dominant orientation calculating step of calculating a dominant orientation of the feature point selected in the selecting of the feature point; and a visual descriptor extracting step of extracting a patch for each feature point selected in the selecting of the feature point, according to the scale, location and dominant orientation of the feature point, and extracting a visual descriptor from the patch.

In the candidate feature point group detecting step, the feature point is detected as being included in the candidate feature point group using one selected from a difference of Gaussians (DoG) detector, a Fast-Hessian detector, a Laplacian of Gaussian (LoG) detector and a Harris/Hessian-affine detector.

In the dominant orientation calculating step, a dominant orientation of the feature point selected in the feature point selecting step is calculated through one selected between a dominant orientation calculating method of scale-invariant feature transfer (SIFT) and a dominant orientation calculating method of Speeded Up Robust Features (SURF).

In the visual descriptor extracting step, the visual descriptor is extracted through one selected among scale-invariant feature transform (SIFT), Speeded Up Robust Features (SURF) and Oriented FAST and Rotated BRIEF (ORB).

In the feature point selecting step, the feature point is selected using an importance table depending on the characteristics of candidate feature point included in the candidate feature point group, wherein the importance table includes at least one of an importance depending on the peak of the candidate feature point, an importance depending on the scale of the candidate feature point, an importance depending on the edge score of the candidate feature point and an importance depending on the location of the candidate feature point.

Dominant orientation calculating step may include: receiving a scale-space layer and feature points detected from the scale-space layer; for each scale space layer in scale space images, calculating a dominant orientation of the feature point after calculating a gradient map of the scale-space layer when the number of the feature points detected from the scale-space layer is larger than or equal to the threshold value; and calculating a dominant orientation of the feature point by direct calculation of gradient without gradient map of the scale-space layer when the number of the feature points detected from the scale-space layer is below the threshold value.

The gradient map of the scale space layer may be calculated using one selected from the calculation of the gradient magnitude and gradient angle that are used in scale-invariant feature transfer (SIFT) and the calculation of the Haar wavelet response used in Speeded Up Robust Features (SURF).

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a block diagram illustrating a system for extracting a visual descriptor using a feature selection according to an exemplary embodiment of the present invention.

DETAILED DESCRIPTION OF EXEMPLARY EMBODIMENTS

Figure 2A:
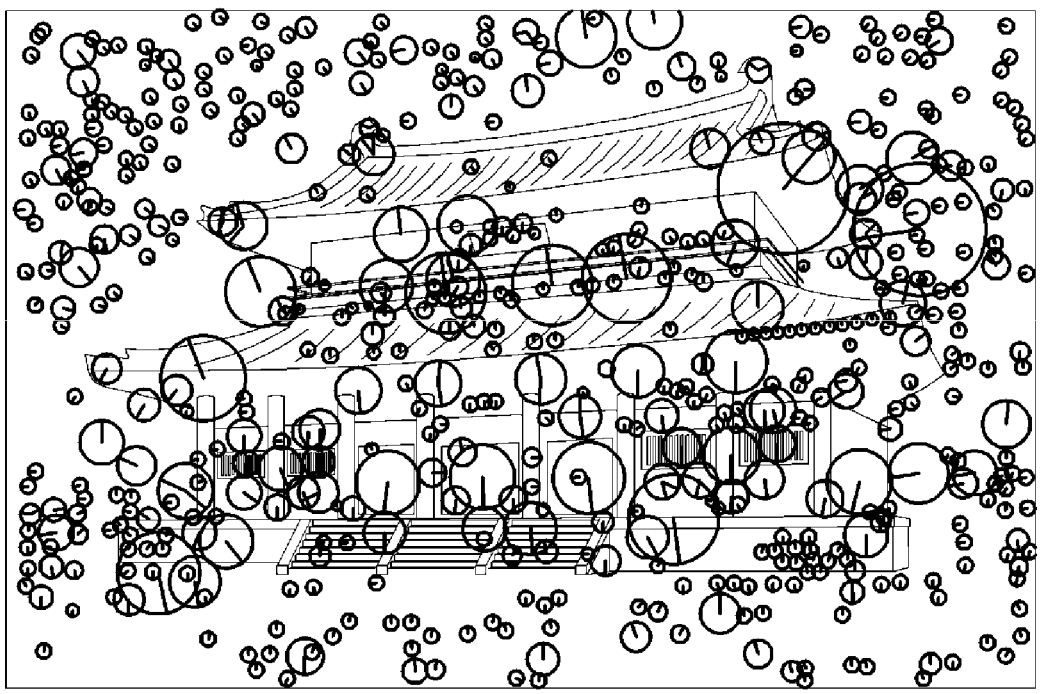
FIG. 2A is a view illustrating all feature points extracted before a feature point selection.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. Although terms to designate components in this specification are selected from generally and widely used terms in consideration of the function of the component in the present invention, the meaning of the term may be changed to convey the intention of those skilled in the art to which the present invention pertains or the customary meaning or adapt to the advent of new technology. In addition, in some cases, terms may be randomly selected by applicants while stating the meaning of the term in the corresponding part of the specification of the present invention. Accordingly, it will be understood that terms used in this specification should be construed based on the substantial meaning of the term and the overall context in the specification, instead of being construed only as a name of the component.

Hereinafter, exemplary embodiments of the present invention will be described in detail with reference to the accompanying drawings.

FIG. 1 is a block diagram illustrating a system for extracting a visual descriptor using a feature selection according to an exemplary embodiment of the present invention.

Referring to FIG. 1, a system 100 for extracting a visual descriptor using a feature selection according to an exemplary embodiment of the present invention includes an image input unit 110, a candidate feature point group detecting unit 120, a feature point selecting unit 130, a dominant orientation calculating unit 140 and a visual descriptor extracting unit 150.

The image input unit 110 may receive an image.

The candidate feature point group detecting unit 120 may detect a point having a local maximum or minimum of local region filtering in scale-space images as being included in a candidate feature point group. According to an exemplary embodiment of the present invention, the candidate feature point group detecting unit 120 may detect a point as being included in the candidate feature point group using at least one selected from a difference of Gaussians (DoG) detector (D. Lowe, "Distinctive image features from scale-invariant keypoints," Int. J. Comput. Vis., vol. 60, no. 2, pp. 91.110, 2004.), a Fast-Hessian detector (Herbert Bay, "SURF: Speeded-Up Robust Features," Computer Vision and Image Understanding 110 pp. 346-359, 2008), a Laplacian of Gaussian (LoG) detector and a Harris/Hessian-affine detector.

The feature point selecting unit 130 calculates an importance for each candidate feature point depending on its characteristics, selects a candidate feature point as a feature point when its importance is greater than the predetermined threshold value, and deletes the candidate feature point when its importance is not greater than the predetermined threshold value.

Figure 2B:
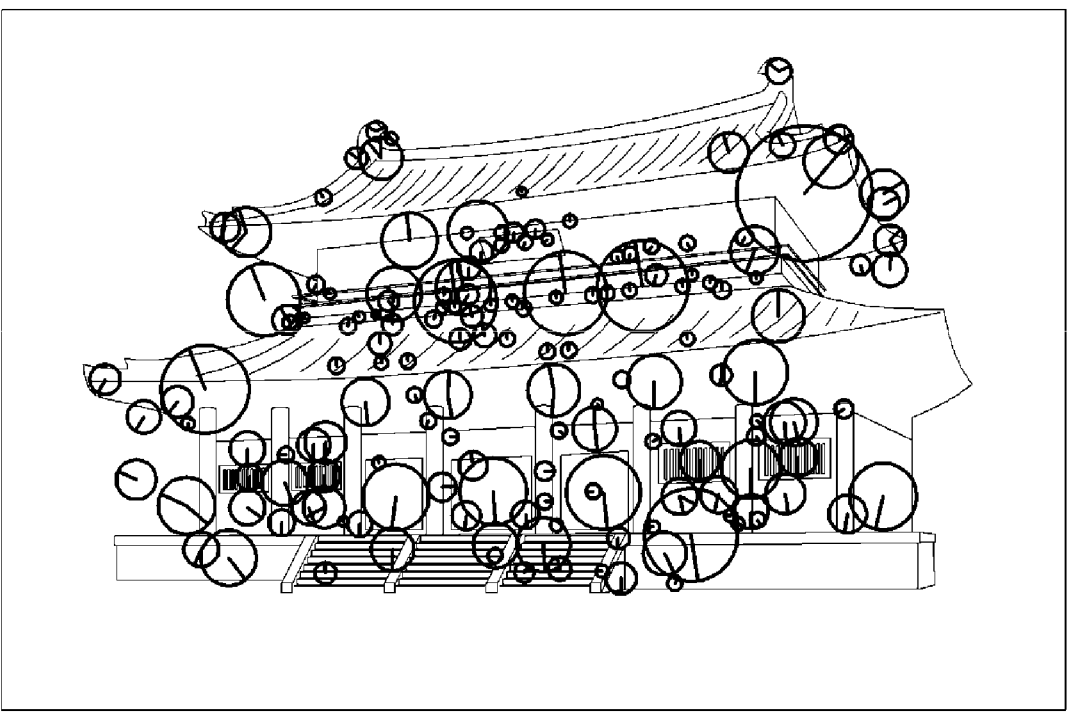
FIG. 2B is a view illustrating a result of a feature point selection according to an exemplary embodiment of the present invention.

FIGS. 2A and 2B illustrate a result of a feature point selection according to an exemplary embodiment of the present invention, which is obtained by using a LoG detector in an exemplary image. FIG. 2A is a view illustrating all feature points extracted before a feature point selection. FIG. 2B is a view illustrating a result of a feature point selection according to an exemplary embodiment of the present invention.

Referring to FIG. 2A, the size of a circle represents the scale of a feature point. There are large numbers of features irrelevant to the objects in background of image, including a sky and a ground. In this case, the matching process is error-prone. In addition, since the number of feature points is great, computational complexity is high to calculate orientation and extract visual descriptor for all of the detected feature points.

Referring to FIG. 2B, feature points relevant to object are selected, and unnecessary feature points are not subject to a calculation of a dominant orientation and a calculation of a visual descriptor, so that the efficiency in computation is enhanced.

The dominant orientation calculating unit 140 calculates a dominant orientation of a feature point selected by the feature point selecting unit 130 such that a visual descriptor to be extracted by the visual descriptor extracting unit 150 is robust to an orientation variation. According to an exemplary embodiment of the present invention, the dominant orientation calculating unit 140 may calculate a dominant orientation of a feature point selected by the feature point selecting unit 130 using one selected from the dominant orientation calculating method of scale-invariant feature transform (SIFT) (D. Lowe, "Distinctive image features from scale-invariant keypoints," Int. J. Comput. Vis., vol. 60, no. 2, pp. 91.110, 2004.) and dominant orientation calculating method of Speeded-Up Robust Features (SURF) (Herbert Bay, "SURF: Speeded Up Robust Features," Computer Vision and Image Understanding 110 pp. 346-359, 2008).

Figure 3:
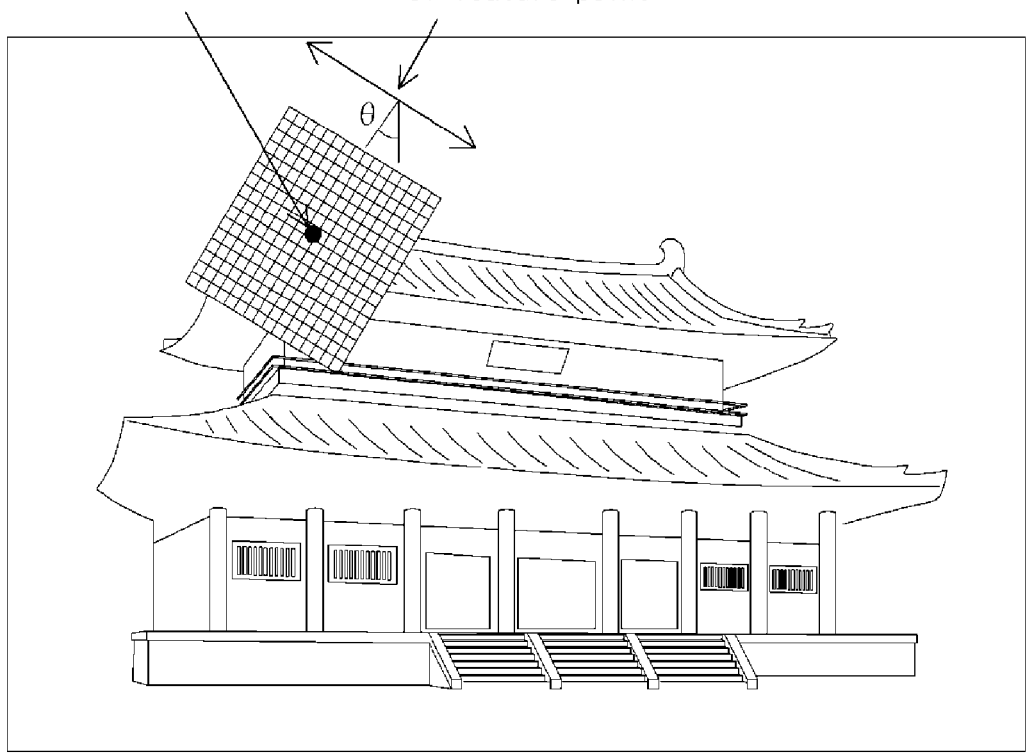
FIG. 3 is a view illustrating an example of calculating a dominant orientation of a feature point according to an exemplary embodiment of the present invention.

FIG. 3 is a view illustrating an example of calculating a dominant orientation of a feature point according to an exemplary embodiment of the present invention. Referring to FIG. 3, a dominant orientation of neighborhood region of a feature point is calculated as shown in angle θ.

Dominant orientation is calculated only for the selected feature point, and when it is assumed that the number of detected candidate feature points is M, the number of feature points selected by the feature point selecting unit 130 is N, and computational complexity of orientation calculation is only related to the number of selected feature points, the computational complexity is reduced by N/M when compared to a conventional method in which the dominant orientation is calculated for all candidate feature points. In case of FIG. 2B, 71.75% of the computation is theoretically reduced in calculating the dominant orientation when compared to FIG. 2A.

The visual descriptor extracting unit 150 extracts a patch for each feature point selected by the feature point selecting unit 130, according to its scale, location and dominant orientation as shown in FIG. 3, and extracts a visual descriptor from the patch. According to an exemplary embodiment of the present invention, the visual descriptor extracting unit 150 may extract a visual descriptor using at least one selected from SIFT, SURF and Oriented FAST and Rotated BRIEF (ORB). Similar to the calculation of the dominant orientation, the visual descriptor is extracted only for the selected feature point, and the computational complexity is reduced when compared to a conventional method.

Each of the candidate feature point group detecting unit 120, the feature point selecting unit 130, dominant orientation calculating unit 140 and the visual descriptor extracting unit 150 operates in units of layers of a scale-space generated by the candidate feature point group detecting unit 120 using a conventional technology.

A method of extracting a visual descriptor using a feature selection according to an exemplary embodiment of the present invention includes an image input step of receiving an image; a candidate feature point group detecting step of detecting a point, having a local maximum or minimum of local region filtering in scale-space images as being included in a candidate feature point group; a feature point selecting step of calculating an importance for each candidate feature point included in the candidate feature point group, depending on its characteristics, selecting the candidate feature point as a feature point when its importance is greater than the predetermined threshold value, and deleting the candidate feature point when its importance is not greater than the predetermined threshold value; a dominant orientation calculating step of calculating a dominant orientation of the feature point selected in the selecting of the feature point; and a visual descriptor extracting step of extracting a patch for each feature point selected by the feature point selecting unit, according to its scale, location and dominant orientation, and extracting a visual descriptor from the patch.

Figure 4:
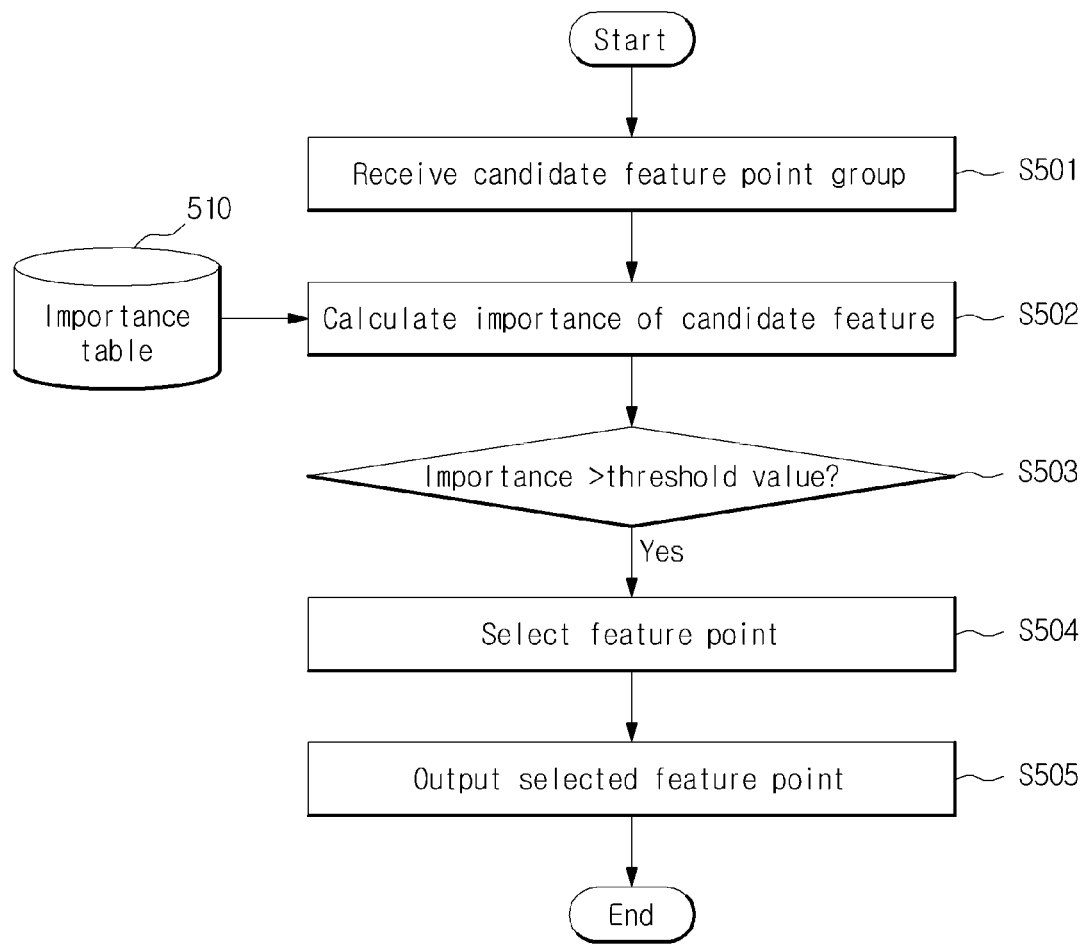
FIG. 4 is a flowchart of a feature point selecting unit of a visual descriptor extracting system using a feature selection according to an exemplary embodiment of the present invention.

FIG. 4 is a flowchart of a feature point selecting unit of a visual descriptor extracting system using a feature selection according to an exemplary embodiment of the present invention.

Referring to FIG. 4, the feature point selecting step of the feature point selecting unit 130 includes receiving a candidate feature point group (S501), calculating an importance for each candidate feature point included in the candidate feature point group, depending on its characteristics using an importance table 510 (S502), selecting the candidate feature point as a feature point (S504) when its importance is greater than the predetermined threshold value (S503), and outputting the selected feature point (S505).

According to an exemplary embodiment of the present invention, with regard to the importance table including an importance depending on the peak of the candidate feature point, an importance depending on the scale of the candidate feature point, an importance depending on the edge score of the candidate feature point and an importance depending on the location of the candidate feature point, a method suggested in a research paper (Gianluca Francini, Skjalg Lepsey, and Massimo Balestri, "Selection of local features for visual search," Signal Processing-Image Communication, 2013) may be used. When the calculated importance of the candidate feature point is greater than the predetermined threshold value, the candidate feature point is selected, this process is performed for all candidate feature points, and a set of finally selected feature points is output.

Figure 5:
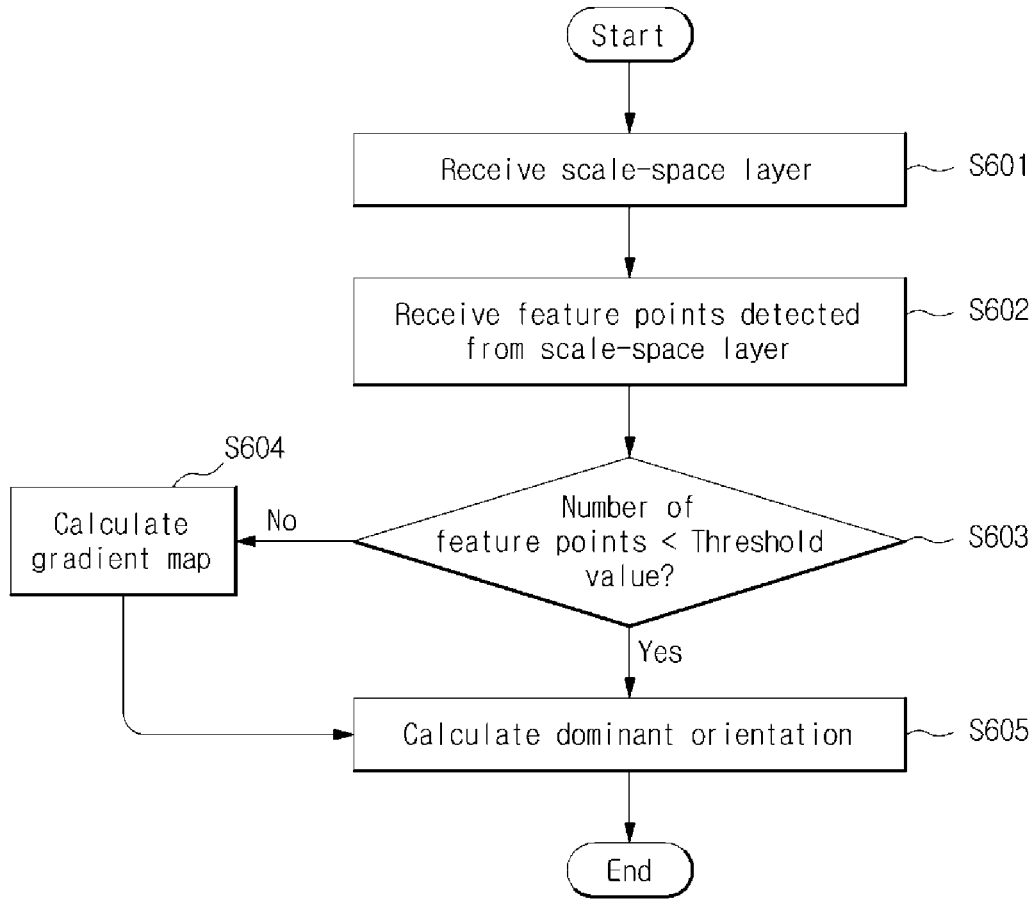
FIG. 5 is a flowchart of a dominant orientation calculating unit of a visual descriptor extracting system using a feature selection according to an exemplary embodiment of the present invention.

FIG. 5 is a flowchart of a dominant orientation calculating unit of a visual descriptor extracting system using a feature selection according to an exemplary embodiment of the present invention.

Referring to FIG. 5, the dominant orientation calculating step of the dominant orientation calculating unit according to an exemplary embodiment of the present invention includes receiving a scale-space layer (S601), receiving feature points detected from the scale-space layer (S602), for each scale space layer in scale space images, determining whether the number of the feature points detected from the scale-space layer is below a threshold value (S603) and calculating a dominant orientation of the feature point without gradient map if it is determined that the number of the detected feature points is below a threshold value (S605). Alternatively, the dominant orientation calculating step may further include calculating a gradient map of the scale-space layer (S604) and calculating the dominant orientation of the feature point using gradient map (S605) if the number of the feature points detected from the scale-space layer is larger than or equal to the threshold value.

The gradient map stores gradient values of all pixels of a current scale-space layer which are calculated in advance to prevent a desired gradient value from being repeatedly calculated during calculation of dominant orientations and calculation of visual descriptors to enhance the computational efficiency.

According to an exemplary embodiment of the present invention, the gradient value may include a gradient magnitude and a gradient angle that are used in SIFT. According to another exemplary embodiment of the present invention, the gradient value may include a Haar wavelet response used in SURF.

Figure 6A:
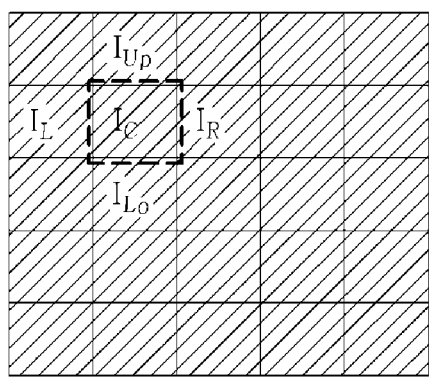
FIGS. 6A and 6B are views showing a method of calculating a gradient map according to an exemplary embodiment of the present invention.
Figure 6B:
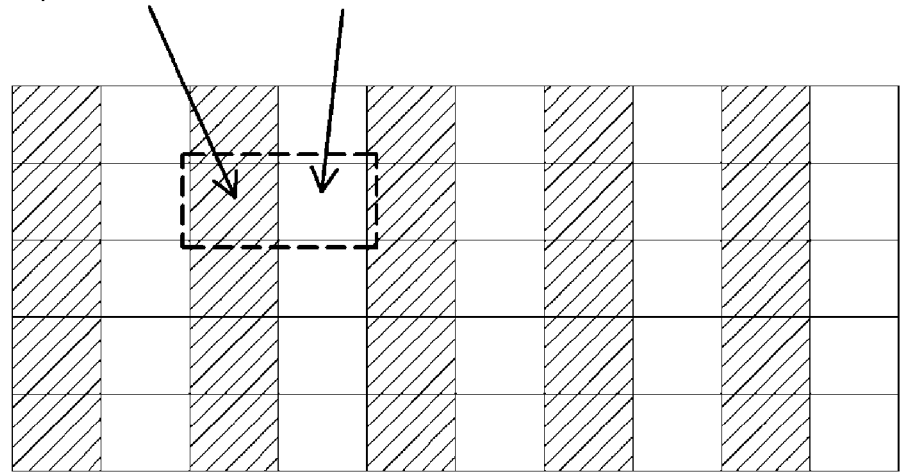

An example of calculating a gradient magnitude and a gradient angle with respect to each of the pixels is shown in FIGS. 6A and 6B. When a gradient map is generated, a memory having twice the size of a current scale-space layer is required. After the calculation of the gradient map, a dominant orientation calculating process is performed. According to an exemplary embodiment of the present invention, the dominant orientation calculating process is performed using an orientation histogram. When the number of input feature points is below a predetermined threshold value, the process of calculating the gradient map is omitted, and the process of calculating the dominant orientation is performed.

FIGS. 6A and 6B are views showing a method of calculating a gradient map according to an exemplary embodiment of the present invention. Referring to FIG. 6A, a resolution of the scale-space layer is M×N, I represents an intensity, and subscripts L, C, Up, R and Lo represent left, center, upper, right, and lower pixels of reference pixels, respectively. $D_x$ may be obtained using the difference between $I_R$ and $I_L$. $D_y$ may be obtained using the difference between $D_{Up}$ and $I_{Lo}$. Here, D represents an intensity difference, and subscripts x and y for the character D represent an x direction and a y direction, respectively.

Referring to FIG. 6B, $M_c = \sqrt{(D_x^2 + D_y^2)}$ and $\theta_c = \tan^{-1}(D_y/D_x)$ may be obtained using $D_x$ and $D_y$. $M_c$ represents a gradient magnitude and $\theta_c$ represents a gradient angle. In this case, the reference pixel is not fixed, but moved along all pixels in the scale space layer.

Figure 7:
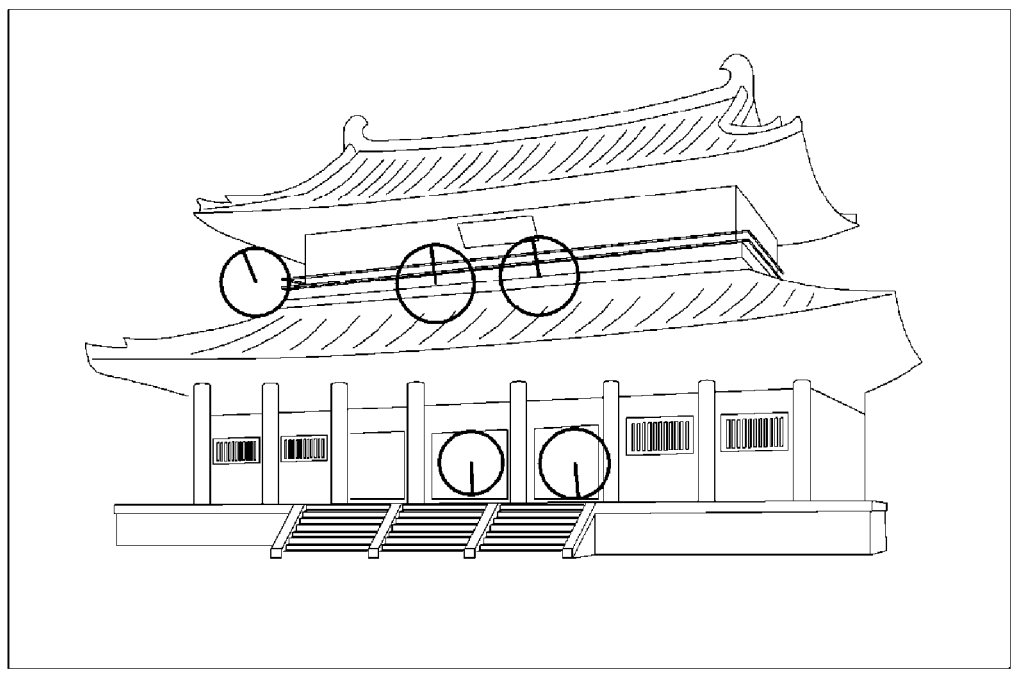
FIG. 7 is a view illustrating feature points detected from a first layer of a fourth octave of a scale-space images among feature points output from a feature point selecting unit according to an exemplary embodiment of the present invention, which shows direct gradient calculations only for the selected features is more efficient in computational complexity and memory usage than calculating a gradient map for whole scale space layer when the number of selected features in this layer is small.

FIG. 7 is a view illustrating feature points detected from a first layer of a fourth octave of a scale-space images among feature points output from a feature point selecting unit according to an exemplary embodiment of the present invention.

Referring to FIG. 7, the scale-space has a resolution of 80×60. Referring to FIG. 7, direct gradient calculations only for the selected features is more efficient in computational complexity and memory usage than calculating a gradient map for whole scale space layer when the number of selected features in this layer is small.

As described above, the present invention can classify candidate feature points depending on importance of the feature points, select a feature point having a high importance, calculate a dominant orientation of the selected feature point adaptively for each scale space layer according to the number of selected feature points in the layer and extract a visual descriptor only for the selected feature points, instead of extracting descriptors of all points.

In addition, the present invention can improve the efficiency of descriptor extraction and matching in terms of memory usage and computational complexity.

The disclosure can be embodied as program instructions executable through various computing devices and can be recorded in a computer readable medium. The computer readable medium may include a program instruction, a data file and a data structure or a combination of one or more of these.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMs), and flash memories. In addition, the above described medium may be a transmission medium such as light including a carrier wave transmitting a signal specifying a program instruction and a data structure, a metal line and a wave guide. The program instruction may include a machine code made by a compiler, and a high-level language executable by a computer through an interpreter.

The above described hardware device may be constructed to operate as one or more software modules to perform the operation of the present invention, and vice versa.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:
1. A system for extracting a visual descriptor using a feature selection, the system comprising:
   an image input unit configured to receive an image;
   a candidate feature point group detecting unit configured to detect a point having a local maximum or minimum of local region filtering in scale-space images as being included in a candidate feature point group;

a feature point selecting unit configured to calculate an importance for each candidate feature point included in the candidate feature point group, depending on characteristics of the candidate feature point, select the candidate feature point as a feature point when the importance of the candidate feature point is greater than the predetermined threshold value, and delete the candidate feature point when the importance of the candidate feature point is not greater than the predetermined threshold value; a dominant orientation calculating unit configured to calculate a dominant orientation of the feature point selected by the feature point selecting unit; and a visual descriptor extracting unit configured to extract a patch for each feature point selected by the feature point selecting unit, according to scale, location and dominant orientation of the feature point, and extract a visual descriptor from the patch, wherein the dominant orientation calculating unit is configured to:

receive a scale-space layer and feature points detected from the scale-space layer;

for each scale space layer in scale space images, calculate a dominant orientation of the feature point after calculating a gradient map of the scale-space layer when the number of the feature points detected from the scale-space layer is larger than or equal to the a threshold value; and calculate a dominant orientation of the feature point by direct calculation of gradient without gradient map when the number of the feature points detected from the scale-space layer is below the threshold value.

2. The system of claim 1, wherein the candidate feature point group detecting unit detects a point as being included in the candidate feature point group using one selected from a difference of Gaussians (DoG) detector, a Fast-Hessian detector, a Laplacian of Gaussian (LoG) detector and a Harris/Hessian-affine detector.

3. The system of claim 1, wherein the dominant orientation calculating unit calculates the dominant orientation of the feature point selected by the feature point selecting unit through one selected between a dominant orientation calculating method of scale-invariant feature transfer (SIFT) and a dominant orientation calculating method of Speeded Up Robust Features (SURF).

4. The system of claim 1, wherein the visual descriptor extracting unit extracts the visual descriptor through one selected among scale-invariant feature transform (SIFT), Speeded Up Robust Features (SURF) and Oriented FAST and Rotated BRIEF (ORB).

5. The system of claim 1, wherein the feature point selecting unit selects the feature point using an importance table depending on the characteristics of candidate feature point included in the candidate feature point group, wherein the importance table includes at least one of an importance depending on a peak of the candidate feature point, an importance depending on the scale of the candidate feature point, an importance depending on an edge score of the candidate feature point and an importance depending on the location of the candidate feature point.

6. The system of claim 1, wherein the calculation of the gradient value is performed using one selected from the calculation of the gradient magnitude and gradient angle that are used in scale-invariant feature transfer (SIFT) and the calculation of the Haar wavelet response used in Speeded Up Robust Features (SURF).

7. A method of extracting a visual descriptor using a feature selection, the method comprising:

an image input step of receiving an image;

a candidate feature point group detecting step of detecting a point having a local maximum or minimum of local region filtering in scale-space images as being included in a candidate feature point group; a feature point selecting step of calculating an importance for each candidate feature point included in the candidate feature point group, depending on characteristics of the candidate feature point, selecting the candidate feature point as a feature point when the importance of the candidate feature point is greater than the predetermined threshold value, and deleting the candidate feature point when the importance of the candidate feature point is not greater than the predetermined threshold value; a dominant orientation calculating step of calculating a dominant orientation of the feature point selected in the selecting of the feature point;

and a visual descriptor extracting step of extracting a patch for each feature point selected in the selecting of the feature point, according to scale, location and dominant orientation of the feature point, and extracting a visual descriptor from the patch, wherein the dominant orientation calculating unit is configured to: receive a scale-space layer and feature points detected from the scale-space layer; for each scale space layer in scale space images, calculate a dominant orientation of the feature point after calculating a gradient map of the scale-space layer when the number of the feature points detected from the scale-space layer is larger than or equal to the a threshold value; and calculate a dominant orientation of the feature point by direct calculation of gradient without gradient map when the number of the feature points detected from the scale-space layer is below the threshold value.

8. The method of claim 7, wherein, in the candidate feature point group detecting step, the feature point is detected as being included in the candidate feature point group using one selected from a difference of Gaussians (DoG) detector, a Fast-Hessian detector, a Laplacian of Gaussian (LoG) detector and a Harris/Hessian-affine detector.

9. The method of claim 7, wherein, in the dominant orientation calculating step, a dominant orientation of the feature point selected in the feature point selecting step is calculated through one selected between a dominant orientation calculating method of scale-invariant feature transfer (SIFT) and a dominant orientation calculating method of Speeded Up Robust Features (SURF).

10. The method of claim 7, wherein, in the visual descriptor extracting step, the visual descriptor is extracted through one selected among scale-invariant feature transform (SIFT), Speeded Up Robust Features (SURF) and Oriented FAST and Rotated BRIEF (ORB).

11. The method of claim 7, wherein, in the feature point selecting step, the feature point is selected using an importance table depending on the characteristics of candidate feature point included in the candidate feature point group, wherein the importance table includes at least one of an importance depending on a peak of the candidate feature point, an importance depending on the scale of the candidate feature point, an importance depending on an edge score of the candidate feature point and an importance depending on the location of the candidate feature point.

12. The method of claim 7, wherein the calculation of the gradient value is calculated using one selected from the calculation of the gradient magnitude and gradient angle that are used in scale-invariant feature transfer (SIFT) and the calculation of the Haar wavelet response used in Speeded Up Robust Features (SURF).

* * * * *